(12) United States Patent
Weindorf et al.

(10) Patent No.: US 7,390,407 B2
(45) Date of Patent: Jun. 24, 2008

(54) LIQUID FILTER

(75) Inventors: Martin Weindorf, Kornwestheim (DE);
Markus Kolczyk, Mundelsheim (DE);
Ralf Blum, Ludwigsburg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 112 days.

(21) Appl. No.: 11/294,377

(22) Filed: Dec. 6, 2005

(65) Prior Publication Data

US 2006/0118476 A1    Jun. 8, 2006

(30) Foreign Application Priority Data

Dec. 6, 2004    (DE) ..................... 10 2004 058 885

(51) Int. Cl.
*B01D 35/14*    (2006.01)
*B01D 35/147*    (2006.01)
*B01D 35/16*    (2006.01)

(52) U.S. Cl. ..................... 210/234; 210/248; 210/444

(58) Field of Classification Search ................ 210/234, 210/248, 232, 444
See application file for complete search history.

(56) References Cited

U.S. PATENT DOCUMENTS 5,888,384 A    3/1999  Wiederhold et al.
6,485,637 B2 *  11/2002  Jainek et al. ................ 210/130
6,644,624 B2 *  11/2003  Jainek ..................... 251/149.6
6,706,181 B1    3/2004  Baumann et al.
2002/0020660 A1  2/2002  Jainek et al.

FOREIGN PATENT DOCUMENTS

| DE | 195 38 883 A1 | 4/1997 |
| EP | 0 839 563 A1 | 5/1998 |
| EP | 1 327 471 A1 | 7/2003 |
| EP | 1 419 809 A1 | 5/2004 |
| EP | 1 479 427 A1 | 11/2004 |

OTHER PUBLICATIONS

European Search Report dated Feb. 13, 2006 (Eight (8) pages), including Translation of Relevant Portion.

* cited by examiner

*Primary Examiner*—Thomas M. Lithgow
(74) *Attorney, Agent, or Firm*—Crowell & Moring LLP

(57) ABSTRACT

A liquid filter, in particular for the lubricating oil of an internal combustion engine, having a housing with an inlet and an outlet formed from a housing pot having a substantially downwardly open filter element installation opening and a screw-on cover that closes the installation opening, and a filter element arranged in the housing, sealingly separating the inlet from the outlet. The screw-on cover has a drain for residual liquid present in the housing with a round drain opening arranged in the central axis of the housing. A device for opening and closing the drain opening is arranged in the area of the drain and connected to an end disk of the filter element so that it moves relative to the drain opening and opens the drain when the cover is unscrewed.

18 Claims, 2 Drawing Sheets

LIQUID FILTER

BACKGROUND OF THE INVENTION

The present invention relates to a liquid filter, in particular for the lubricating oil for an internal combustion engine, which has a pot-shaped housing with a screw-on cover and a drain for residual liquid being provided in the screw-on cover. The invention also relates to a filter element which is suitable for installation in the liquid filter of the invention.

A filter of this type is known, for example, from U.S. Pat. No. 5,888,384 (=DE 196 44 647). This filter has a pot-shaped housing which has a downwardly directed installation opening for the filter cartridge. After the filter cartridge has been installed, a screw-on cover can be screwed into the installation opening. The inlet and outlet for the filter are located in the housing pot, i.e., in the upper part of the filter housing. Therefore, the housing and in particular the screw-on cover are always filled with the liquid to be filtered even outside of operating time. This makes it difficult to change the filter cartridge because this residual liquid can enter the environment when the cover is being screwed off. Therefore, a drain plug is provided at the lowest point of the screw-on cover so that the drain plug can be loosened to remove the remaining liquid in the screw-on cover. This greatly facilitates the replacement of a filter cartridge.

The proposed liquid filter is used in particular as an oil filter for internal combustion engines, where the space situation is often very restricted because of other components in the engine compartment. Therefore, the are often problems associated with operation of the drain plug. Furthermore, the oil running out of the drain opening must be collected. This is often possible only under difficult conditions because of the tight installation situation because a collecting container with a sufficient volume cannot be placed beneath the drain opening.

SUMMARY OF THE INVENTION

It is therefore an object of the present invention to provide an improved liquid filter with a screw on cover at the bottom.

Another object of the invention is to provide a liquid filter having a liquid drain in the screw-on cover which can be emptied reliably even under tight installation conditions.

These and other objects are achieved in accordance with the present invention by providing a liquid filter comprising a housing having an inlet and an outlet, said housing comprising a housing pot with a substantially downwardly open filter element installation opening and a screw-on cover that closes the installation opening, said screw-on cover having a drain for discharging residual liquid present in the housing; a filter element arranged in the housing sealingly separating the inlet from the outlet, and a device arranged in the area of said drain for opening and closing said drain; in which the drain comprises a round drain opening arranged on the central axis of the housing, and the device for opening and closing the drain is connected to one axial end of the filter element and is displaced axially relative to the drain opening to open the drain opening when the screw-on cover is unscrewed.

In accordance with a further aspect of the invention, the objects are also achieved by providing a filter element for a liquid filter comprising housing formed from a housing pot with a substantially downwardly open filter element installation opening and a screw-on cover that closes the installation opening, said screw-on cover having a drain opening for discharging residual liquid present in the housing, said filter element comprising a hollow cylindrical filter medium and an end disk on each axial end of the filter medium, wherein the filter element is connectable to the housing, and the filter element carries a device for opening or closing the drain opening in the screw-on cover of the housing when the screw-on cover is unscrewed or screwed on, respectively.

The liquid filter according to the invention is intended for installation in a hanging position. In other words, the installation opening for the filter cartridge, which is formed by the housing pot and closed by the screw-on cover, points downward. The housing axis need not stand vertically upright. Instead, the housing can be aligned so the central axis of the housing points obliquely downward. The housing pot need not be a separate part. It is also conceivable for the pot to be formed as part of another component, e.g., the engine block.

A drain for residual liquid is provided in the screw-on cover, with a device for opening and closing the drain being arranged in the area of the drain. This device closes a drain opening, which preferably is round, arranged in the central axis of the housing through use of a gasket. The gasket may be an O-ring, for example, but it is also possible for the device for opening and closing to also assume such a sealing function as a result of an appropriate choice of material. This device is connected to the filter element and can be connected to the end disk of the filter element, for example, or to a support tube situated in the filter element. This device is preferably connected to the end disk or the supporting body of the filter element in such a way that its axial play relative to the central axis of the housing is limited. This should also be understood to include the possibility of not providing any axial play for the device at all. The device may, for example, be a hollow cylindrical or closed valve rod and may be detachably connected to the end disk or the support tube via a screw connection or a catch connection or inseparably connected to the end disk via an adhesive joint or welded joint. Another possibility is to manufacture the device in one piece with the end disk or the support tube by the primary forming method.

When the screw-on cover which contains the round drain opening is loosened, it moves in relation to the device for opening or closing the outlet, the axial movement of which is limited. Therefore, the gasket of the device is extracted from the drain opening, which is thus automatically opened to allow the residual liquid to drain out. As soon as the liquid has drained out, the screw-on cover can be unscrewed completely from the housing pot, so that the filter element can then be replaced.

The advantage of this approach is that the drain opening is automatically opened by partially screwing off the screw-on cover. Therefore, the closure of the drain opening need not be accessible for special tools, e.g., a wrench. Since the operating space requirement of an opening tool for the drain opening need not be taken into account, the liquid filter of the invention can also be installed even under tight space conditions. This results in a greater geometric design freedom for the internal combustion engine.

In accordance with one advantageous embodiment of this invention, an outlet for residual liquid is provided in the screw-on cover. This outlet is provided with a connection for a drain device which can be installed for the purpose of draining it and can then be removed again after draining out the residual liquid. This has the advantage that there need only be enough space for connecting the drain device in the direct area of the drain. The drain device can be connected to the drain, and the drain is then opened. The drain device conveys the liquid to a receiving container provided for this purpose. As soon as all the residual liquid has been removed from the housing, the drain device can be detached so that it no longer interferes with the opening of the screw-on cover.

In accordance with one specific embodiment of the invention, the drain device comprises a tube that can be attached to a corresponding tube connecting nipple on the screw-on cover. This variant constitutes a particularly simple option for implementing the drain device. Thus there is no increased component complexity here, and this makes this approach more economical. Appropriate drain tubes are easy to acquire and are available in the repair shop performing the service.

It is advantageous to provide a support tube detachably or permanently connected to the housing pot. In such a case, the filter element can be pushed onto the support tube. Such support tubes are provided in many applications to support the filter element with respect to the pressure differences prevailing on the filter medium. The support tube may be made of a plastic or metal, preferably by an injection molding process. The connection to the housing pot may be established by a screw connection, a clip connection or a bayonet closure in the case of a releasable connection or by gluing or welding in the case of a permanent connection. If the device for opening or closing the drain is connected to a support tube arranged in the filter element, then the filter element may be connected to the support tube which is arranged in the housing, via the support tube arranged in the element. This can be accomplished by using a clip connection or a screw connection.

In accordance with another embodiment of this invention, the filter element has an end disk in the form of an annular disk on the axial end in the direction of the housing pot. The end disk may be made of plastic or metal and attached to the filter medium by a welding or gluing method. An annular, concentric ring collar extending axially in the direction of the housing pot is arranged on this end disk. The axial end of the ring collar forms an axial end stop for the filter element in the installed state. In other words, the axial end of the ring collar finds a stop in the housing pot and therefore the axial position of the filter element in the installed state is defined by this arrangement. The ring collar may be joined in one piece to the end disk and manufactured with it in the injection molding process, for example, or subsequently attached, either detachably or permanently, to the end disk. For this purpose, the housing pot preferably has a flat continuous stop surface, preferably in the form of a circular ring, to receive the axial end stop of the end disk of the filter element. The flat continuous stop surface corresponds here to the contour of the ring collar and may be created in the housing pot, for example, by cutting.

It is advantageous if the support tube has an annular concentric ring collar extending axially of the direction of the housing pot. The axial end of the ring collar of the support tube attached to the housing is also in contact with the aforementioned stop surface of the filter housing. An axial end stop need not necessarily be formed here. There may also be a minimal air gap between the ring collar and the stop surface. It is desirable for the ring collar to extend approximately up to the stop surface.

In accordance with another advantageous embodiment of this invention, the filter element is connected by the ring collar which is arranged on the end disk of the filter element to the ring collar of the support tube which is in turn connected to the housing in the installed state of the filter element. According to this invention, this connection is designed to be liquid-tight so that a separation is maintained at this point between the raw unfiltered side and the clean filtered side of the filter. The connection between the two ring collars may be accomplished in this case by a suitably designed clip connection, for example, where the seal may be provided by a suitable pressure and choice of materials or through the use of an additional sealing aid such as O-rings.

The invention also relates to a filter element for the liquid filter described above. This filter element according to the invention comprises a hollow cylindrical filter medium and an end disk on each of the axial ends of the filter medium. The filter element can be connected to the housing, with the connection defining and securing the position. On the end of the filter element opposite the housing pot, there is a device connected to the filter element for opening or closing the housing outlet.

According to an advantageous embodiment of this invention, one of the end disks is designed to be a closed disk connected to a device for opening and closing the drain and the other end disk is designed as an annular disk having a ring collar extending axially away from the filter medium. The end disks may be made of a plastic such as polyamide (e.g. nylon) or nitrile rubber, but it is also possible to use end disks made of metal here as well. The end disks are attached to the filter medium by an adhesive joint or a weld. The device for opening and closing the drain may be attached in one piece to the one end disk or detachably attached by a clip connection or a screw connection. Any detachable or permanent joining techniques known in the art could be used here.

A similar situation exists with the annular collar of the other end disk. It may likewise be constructed in one piece with the end disk or attached to the end disk by any conceivable detachable or permanent joining options.

As an alternative to this, the device for opening or closing the outlet may also be connected to a hollow cylindrical support tube arranged in the filter element. In this case, the support tube closes the axial end of the filter element which is opposite the filter pot. The device for opening and closing the outlet may be connected to the support tube in a manner similar to the embodiment connected to the end disk.

In accordance with an advantageous embodiment of the filter element, the device for opening or closing the outlet comprises a tubular partial piece which is open at the lower end. The partial piece protrudes into the drain opening, and the tubular wall of the partial piece is provided with passages. Above the passages a radial sealing member is provided on the partial piece in the area of the drain opening. In the installed state of the filter element, the passages are covered by a bushing in the screw-on cover. Screwing off the cover causes the passages to move into the interior of the screw-on cover, so that the residual liquid can pass through the passages into the outlet end. This makes it possible to drain off the residual liquid.

In an alternative embodiment, the device for opening and closing the outlet comprises a tubular or rod-shaped partial piece which is closed on the lower end. In this case the partial piece protrudes into the drain opening and at least one radial sealing member is arranged on the partial piece in the area of the drain opening. Screwing off the cover causes the tubular or rod-shaped partial piece to move into the interior of the screw-on cover, so that residual liquid can flow through the partial piece and flow out through the outlet end. This method also makes it possible to drain off the residual liquid.

To facilitate handling of the filter element, it is advantageous if the closed end disk has a larger outside diameter than the filter medium itself. The resulting radially protruding part provides a good opportunity for pulling the filter element down from the support tube after unscrewing the screw-on cover without directly gripping the filter element itself, which is extremely oily.

To also increase the operational reliability of the filter, a bypass valve may be provided in the end disk. This is necessary only if the required oil flow through the element is no longer ensured due to an excessive particulate blockage, so that at least part of the oil can flow directly through the bypass valve from the from the raw unfiltered side into the clean filtered side. To do so, a through-opening must be provided in the end disk, with the bypass valve situated in the through-opening.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
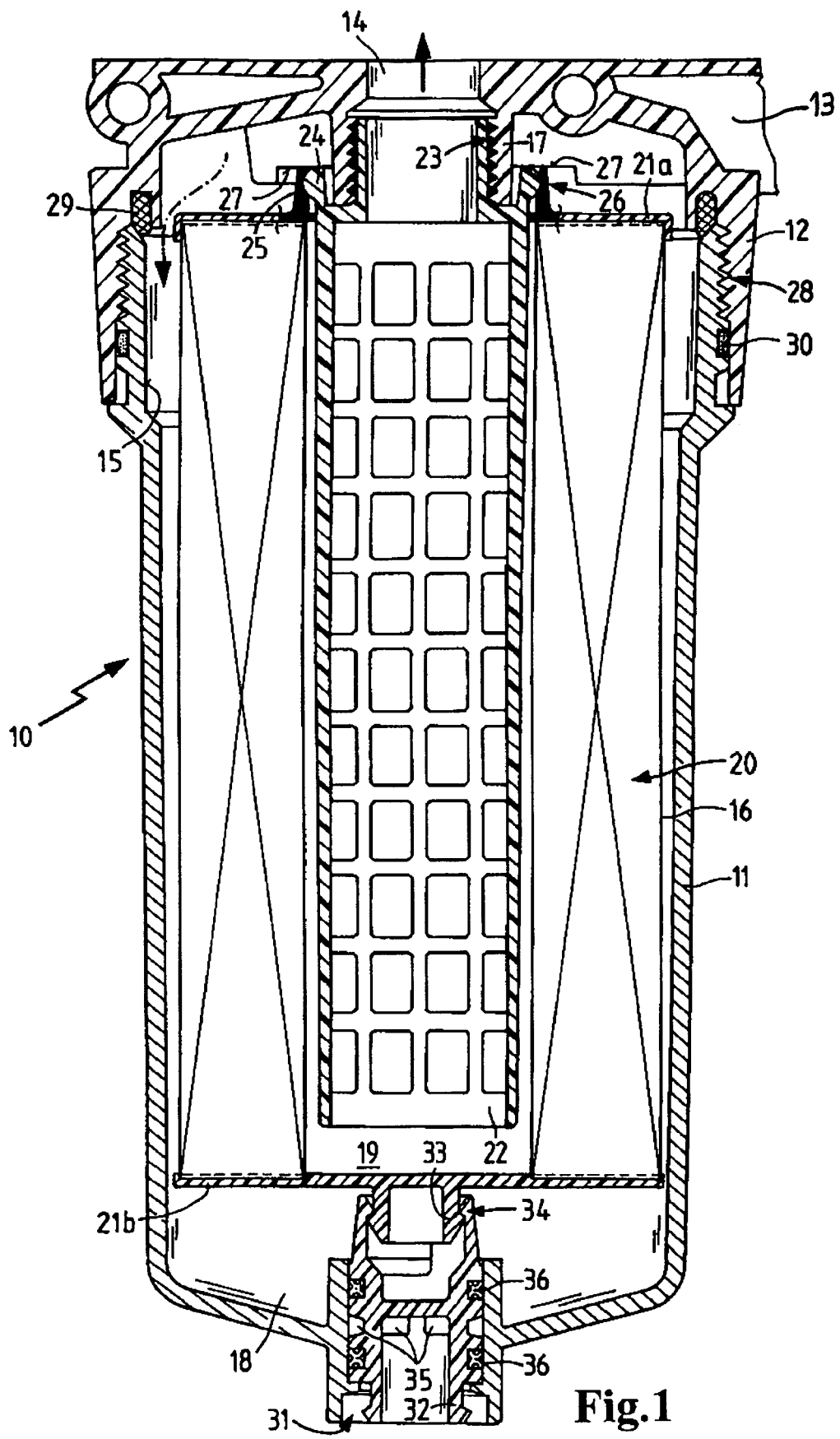
FIG. 1 is a longitudinal sectional view through a filter according to the invention.

The filter shown in FIG. 1 comprises a housing 10 which includes a screw-on cover 11 that is screwed into a housing pot 12. The housing pot 12 may be constructed as part of an engine block (not shown) or as a separate filter head. An inlet 13 and an outlet 14 for the lubricating oil to be filtered for the internal combustion engine are also provided in this engine block or separate filter head. The housing pot 12 has a mouth or opening 15 that points downward and allows the installation of a filter element 16. To assemble the filter, the filter element is pushed onto a support tube 22, thereby forming a seal between a raw unfiltered side 18 and a clean filtered side 19 of the filter medium 20.

The filter medium 20 is sealed axially by an upper end disk 21a and a lower end disk 21b. The support tube 22 is connected to the housing pot 12 by a threaded connection 23. Parallel to the threaded connection 23, the support tube 22 has an annular collar 24 with a larger diameter. The filter element 16 is connected to the support tube by a tight snap connection 26 via an annular collar 25 on the end disk 21a extending axially away from the filter element. The seal between the raw side and the clean side is provided by the tight snap connection 26. This can be accomplished by a suitable choice of materials and/or by a strongly biasing the two parts against each other. An axial stop 27 for the annular collar 25 on the end disk 21a of the filter element 16 is provided in the housing pot 12 in the area of the annular collars 24, 25.

The housing pot 12 and the screw-on cover 11 are screwed together by a threaded connection 28. The screw-on cover 11 may be made of synthetic resin material (i.e., plastic) or metal, preferably synthetic resin material. To seal the liquid system with respect to the environment, a first circumferential gasket 29 is provided between the housing pot 12 and the screw-on cover 11. Furthermore, an additional O-ring 30 is provided in the area of the connection between the screw-on cover 11 and the housing pot 12 to prevent liquid from running out over a certain axial area when the screw-on cover 11 is loosened.

A drain opening 31 is provided in the lower area (i.e., the lowest point of the screw-on cover 11). A tubular partial piece 32 protruding into this opening is attached to an annular collar 33 on the end disk 21b by a clip connection 34. Tubular partial piece 32 has passages 35 that are distributed around the circumference and extend to the interior of the hollow cylindrical partial piece 32. These passages 35 are framed by two rectangular annular gaskets 36, one being arranged above and the other below the passages 35 on the tubular partial piece 32. In the closed form depicted here, the passages 35 are situated in the interior of the drain opening 31 and are separated from the liquid in the interior of the raw unfiltered side 18 by the rectangular annular gaskets 36.

Figure 2:
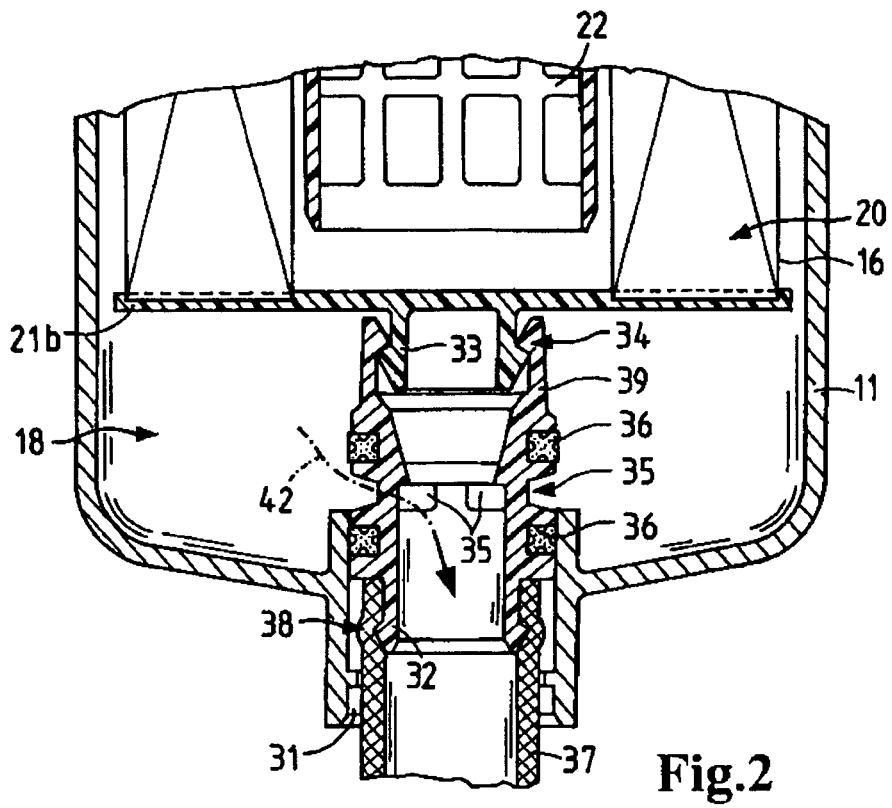
FIG. 2 shows the outlet of the filter of FIG. 1 in an opened state.

FIG. 2 shows the area of the drain opening 31 in the opened state. Parts corresponding to those in FIG. 1 are identified by the same reference numerals. A hose 37 for removing the liquid is pushed onto the end of tubular partial piece 32 and is detachably secured by a retaining bead 38 at the lower end of the tubular partial piece 32. When the screw-on cover 11 is unscrewed from the housing pot 12, the cover is shifted downward in relation to the filter element 16 which is mounted on the support tube 22, but the oil is prevented by the O-ring 30 from running out through the area of the threaded connection 28. Due to the relative movement in the axial direction of the screw-on cover 11 to the housing pot 12, the passages 35 of the tubular partial piece 32 are opened, whereupon the oil present in the housing 10 then flows in the direction of the arrow 42 through the passages 35 into the interior of the tubular partial piece 32 and can be conveyed from there through the hose 37 to, for example, a collecting tank. This achieves the result that before complete disassembly of the screw-on cover 11, it can be emptied, and the oil which flows out can be collected for later disposal. After being emptied of oil, the screw-on cover 11 can be removed without risk of contaminating the environment with oil, and then the filter element 16 can be removed from the support tube 22 to be replaced by a new element as maintenance.

Figure 3:
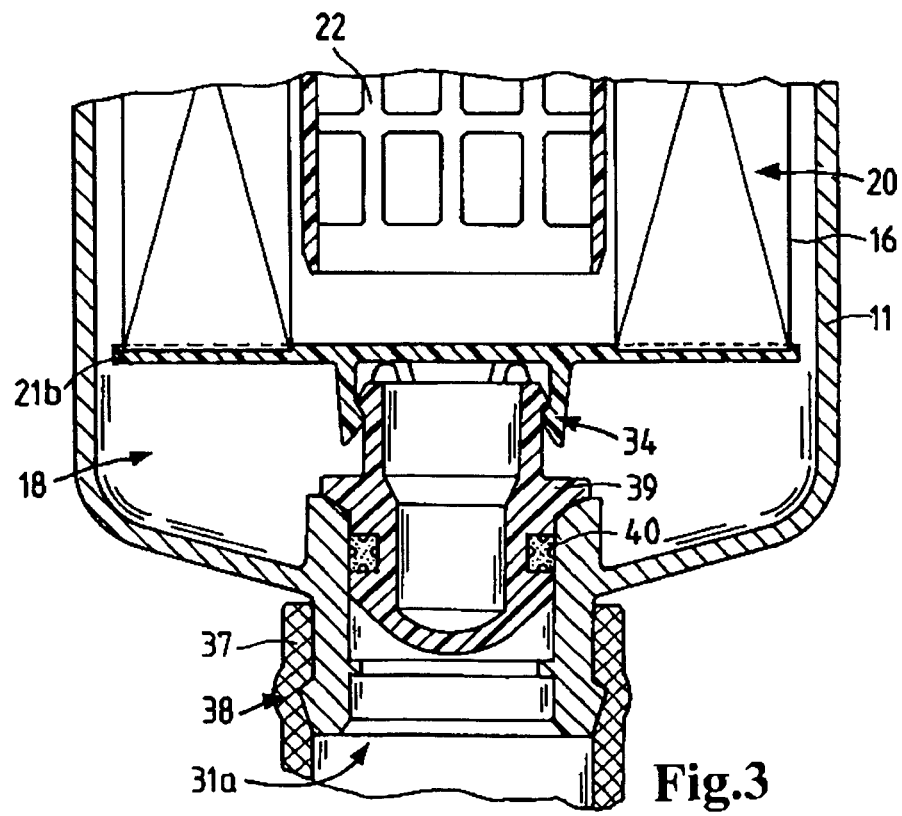
FIG. 3 shows another variant of the outlet of the filter of FIG. 1 with an attached drain tube and in a closed state.

FIG. 3 shows another embodiment of the liquid filter in the area of the drain opening 31, with the drain opening being shown in the closed state. Parts corresponding to those shown in the preceding figures are identified by the same reference numerals. In this case, the drain opening 31a has an outer bead 38 which detachably holds the drain hose 37 on the housing 11. The drain opening 31a is sealed by a sealing plug 39, and sealing plug 39 is provided with an annular gasket 40 in the area of its axial end. Similar to the arrangements shown in the preceding figures, the sealing plug 39 is connected to the end disk 21b of the filter element 16 by a clip connection 34. When the screw-on cover 11 is loosened, the cover is displaced axially and the sealing plug 39 is withdrawn from the drain opening 31 after a certain axial displacement of the screw-on cover 11, so the oil on the raw unfiltered side 18 can flow around the sealing plug 39 and can be discharged through the hose 37. This embodiment is especially simple to construct and is therefore inexpensive.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising:
 a housing having an inlet and an outlet, said housing comprising a housing pot with a substantially downwardly open filter element installation opening and a screw-on cover that closes the installation opening, said screw-on cover having a drain for discharging residual liquid present in the housing,
 a filter element arranged in the housing sealingly separating the inlet from the outlet, said filter element including a filter medium and having two axial ends with one of said axial ends proximate the screw-on cover having a substantially closed end disk bonded to the filter medium, and
 a device arranged in the area of said drain for opening and closing said drain;
 wherein said drain comprises a round drain opening arranged on the central axis of the housing, and the device for opening and closing the drain is connected to the substantially closed end disk of the filter element with limited axial play so the device can move a limited distance axially relative to the filter element, and the device is displaced axially relative to the drain opening to open the drain opening when said screw-on cover is unscrewed.

2. A liquid filter according to claim 1, wherein the drain is provided with a connector for a removable discharge device.

3. A liquid filter according to claim 2, wherein said connector comprises a hose connecting nipple, and the discharge device comprises a hose that can be pushed onto the hose connecting nipple.

4. A liquid filter according to claim 1, wherein a support tube is provided in the housing pot, and the filter element is mounted on the support tube.

5. A liquid filter according to claim 4, wherein said support tube is detachably mounted in the housing pot.

6. A liquid filter according to claim 4, wherein the filter element has an annular end disk on the axial end proximate the housing pot, said end disk having an annular stop collar extending axially toward the housing pot such that the axial end of the annular stop collar forms an axial end stop for the filter element when the filter element is installed in the housing.

7. A liquid filter according to claim 6, wherein the housing pot is provided with a flat continuous stop surface to receive the axial end stop of the filter element end disk.

8. A liquid filter according to claim 7, wherein said support tube has an annular seal collar extending axially toward the housing pot such that the axial end of the annular seal collar is in contact with the stop surface of the housing pot.

9. A liquid filter according to claim 4, wherein the filter element is connected by the annular stop collar with a liquid-tight seal to the annular seal collar of the support tube when the filter element is installed in the filter.

10. A liquid filter according to claim 1, wherein said housing inlet and outlet are connected to the lubricating oil circuit of an internal combustion engine.

11. A filter element for a liquid filter comprising housing formed from a housing pot with a substantially downwardly open filter element installation opening and a screw-on cover that closes the installation opening, said screw-on cover having a drain opening for discharging residual liquid present in the housing, said filter element comprising a hollow cylindrical filter medium and an end disk on each axial end of the filter medium with the axial end disk proximate the screw-on cover being a substantially closed end disk bonded to the filter medium, wherein the filter element is connectable to the housing, and the filter element carries a device for opening or closing the drain opening in the screw-on cover of the housing when the screw-on cover is unscrewed or screwed on, respectively, said device being connected to the substantially closed end disk with limited axial play so that the device can move a limited distance axially relative to the filter element.

12. A filter element according to claim 11, wherein one end disk is constructed in the form of a closed disk and is connected to the device for opening or closing the drain, and the other end disk is constructed in the form of an annular disk and has an annular collar extending axially away from the filter medium.

13. A filter element according to claim 11, wherein the device for opening or closing the drain is detachably connected to the substantially closed end disk by a catch connection.

14. A filter element according to claim 11, wherein the device for opening or closing the drain opening comprises a hollow tubular member which extends into the drain opening and is open at its lower end, said tubular member being provided with radial passages extending through the tubular wall thereof, and a radial seal arranged on the tubular member above the passages in the area of the drain opening.

15. A filter element according to claim 11, wherein the device for opening or closing the drain opening comprises a cylindrical plug with a closed lower end which extends into the drain opening, and a radial seal arranged on the plug in the area of the drain opening.

16. A filter element according to claim 11, wherein the end disk of the filter element remote from the housing pot has a larger outside diameter than the filter medium of the filter element and protrudes radially outwardly of the filter medium such that the filter element can be handled by the protruding part of the end disk.

17. A filter element according to claim 11, further comprising a a bypass valve provided in one of the end disks.

18. A liquid filter according to claim 1, wherein the device for opening or closing the drain is detachably connected to the substantially closed end disk by a catch connection.

* * * * *